March 5, 1929. W. CLUFF 1,704,555
EMBLEM DISK FOR SPARE TIRE COVERS
Filed May 12, 1928
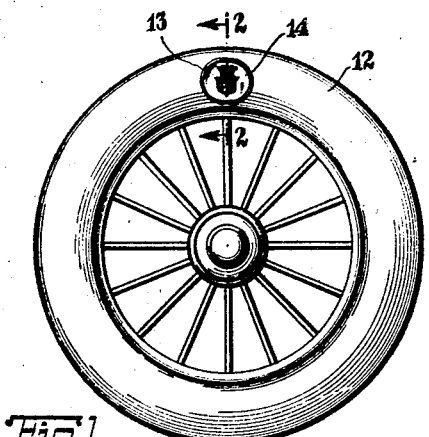
Fig. 1.
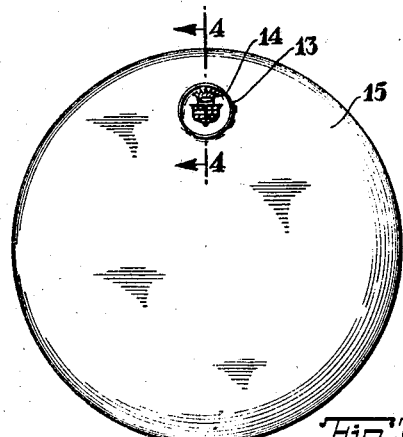
Fig. 3.
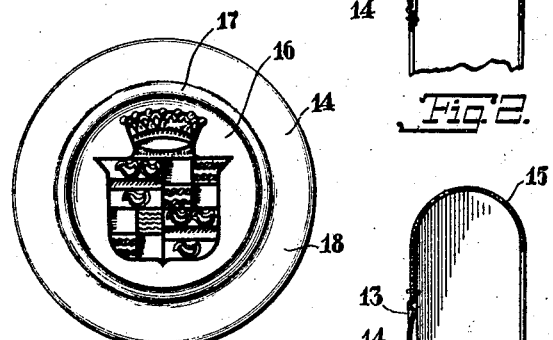
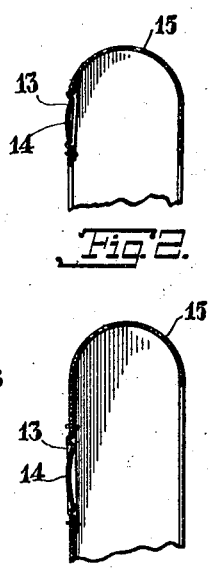
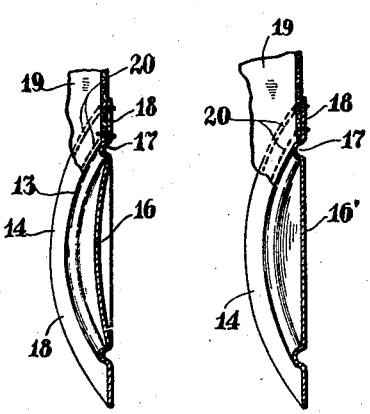
Fig. 5.
Fig. 2.
Fig. 6.   Fig. 7.
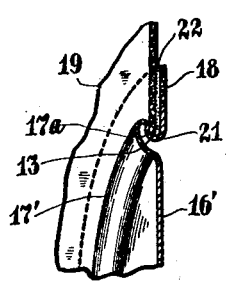
Fig. 4.
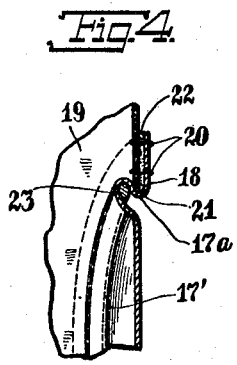
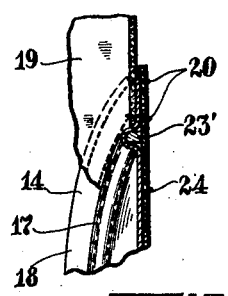
Fig. 8.
Fig. 9.
Fig. 10.
INVENTOR.
*William Cluff*
BY
*[signature]*
ATTORNEY Patented Mar. 5, 1929.

1,704,555

UNITED STATES PATENT OFFICE.

WILLIAM CLUFF, OF NEW YORK, N. Y.

EMBLEM DISK FOR SPARE-TIRE COVERS.

Application filed May 12, 1928. Serial No. 277,144.

This invention relates generally to motor vehicle spare tire covers, and has more particular reference to a novel emblem disk therefor.

The invention has for an object the provision of a device of the class mentioned which is of simple durable construction, efficient in action, and which can be manufactured and sold at a reasonable cost.

The invention proposes the use of an emblem disk of hard, flexible, and resilient material, such as sheet celluloid or the like, adapted for attachment on a spare tire cover, and comprising a central emblem portion surrounded by a circular embossed rib which is in turn surrounded by a circular flange. An emblem of a car manufacturer is printed, stamped, painted or impressed on the front of the emblem portion.

This emblem disk is intended to engage behind a circular opening in the tire cover, the edges surrounding this opening should engage against the circular rib for shielding purposes, and the flange should be secured to the rear side of the tire cover, by stitches, cement, or the like. A circular wire may be disposed within the embossed circular rib for strengthening purposes.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a front elevational view of a circular spare tire cover constructed according to this invention.

Fig. 2 is a framentary vertical sectional view thereof, taken on the line 2—2 of Fig. 1.

Fig. 3 is a front elevational view of a drum type spare tire cover, constructed according to the same invention.

Fig. 4 is a fragmentary vertical sectional view thereof, taken on the line 4—4 of Fig. 3.

Fig. 5 is a front elevational view of the emblem disk used in the said tire cover.

Fig. 6 is a central vertical sectional perspective view thereof, with a piece of the tire cover applied.

Fig. 7 is a similar view of a modified form of the device.

Fig. 8 is a fragmentary similar view of another modified form.

Figs. 9 and 10 are more similar views of further modified forms.

The reference numeral 12 indicates generally a circular spare tire cover formed with an aperture 13 and an emblem disk 14 is secured to the rear side of the cover and visible thru the said aperture.

In Figs. 3 and 4, a drum type spare tire cover 15 is shown, provided with an aperture 13 and the same emblem disk 14 is secured to the rear side of the cover and visible thru the said aperture.

As shown in Figs. 5 and 6, the emblem disk 14, preferably made of sheet celluloid or other hard and elastic material, consists of a central emblem portion 16 of curved contour in transverse section, surrounded by an integral outwardly shaped circular rib 17 which is in turn surrounded by an integral circular flange 18. When applied to a tire cover such as 19, the flange 18 is placed on the rear side of the cover which is formed with an aperture 13 and the edges of the cover surrounding the aperture are arranged for fitting against the rib 17 for protection against accidental tearing off. Stitches 20 are used for securing the flange 18 and the cover material together.

The modified form of the device illustrated in Fig. 7 shows the central emblem portion 16' of flat form in transverse cross section.

In Fig. 8 another modified form has been illustrated in which the circular outwardly shaped rib 17' is formed with an inwardly depressed portion 17ª for forming a groove 21 for receiving the edge of the cover surrounding the opening 13. The flange 18, is secured to the rear of the cover by cement 22 disposed therebetween.

In Fig. 9, a wire 23 is shown disposed within the rib 17' for reinforcing the rib against caving in and breaking when accidental strain is placed thereon, as for example when a person steps thereon, or a car runs thereover. Both the cement 22 and the stitches 20 are used for securing the flange on the cover.

In Fig. 10, a wire 23' is shown disposed within the rib 17 as a reinforcement and a lining 24 is secured to the rear side of the device by the same stitches 20 used to secure the flange to the cover.

While I have shown and described the preferred embodiment of my invention, It is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device of the kind described, comprising a spare tire cover formed with a circular aperture, an emblem disk covering the said opening, a circular outwardly projecting rib integral with the emblem disk, and formed with an inwardly depressed portion for providing a groove, the edge of the tire cover surrounding the said circular aperture being disposed within the said groove for shielding this edge against accidental tearing off, and an integral flange surrounding the rib and arranged for holding the disk against displacement.

2. A device of the kind described, comprising a spare tire cover formed with a circular aperture, an emblem disk covering the said opening, a circular rib projecting from the emblem disk and formed with an inwardly depressed portion for providing a groove, the edge of the tire cover surrounding the said circular aperture being disposed within the said groove for shielding this edge against accidental tearing off, and an integral flange surrounding the rib and arranged for holding the disk against displacement.

3. A device of the kind described, comprising a spare tire cover formed with an aperture, an emblem disk covering the said opening, an outwardly projecting rib integral with the emblem disk, and formed with an inwardly depressed portion for providing a groove, the edge of the tire cover surrounding the said aperture being disposed within the said groove for shielding this edge against accidental tearing off, and an integral flange surrounding the rib, and arranged for holding the disk against displacement.

4. A device of the kind described, comprising a spare tire cover formed with a circular aperture, an emblem disk covering the said opening, a circular outwardly projecting rib integral with the emblem disk, and formed with an inwardly depressed portion for providing a groove, the edge of the tire cover surrounding the said circular aperture being disposed within the said groove for shielding this edge against accidental tearing off, an integral flange surrounding the rib and arranged for holding the disk against displacement, and a wire disposed within the said rib.

5. An emblem disk for a spare tire cover, comprising a disk having a central emblem portion surrounded by an integral outwardly projecting rib formed with an inwardly depressed portion for providing a groove for accommodating the edge of an opening in a spare tire cover arranged for receiving the disk, and an integral flange surrounding the said rib.

In testimony whereof I have affixed my signature.

WILLIAM CLUFF.